United States Patent [19]

Iwata et al.

[11] Patent Number: 4,735,975

[45] Date of Patent: Apr. 5, 1988

[54] FRICTION MATERIAL

[75] Inventors: Kouichi Iwata; Hiroshi Asano, both of Itami, Japan

[73] Assignee: Sumitomo Electric Industries, Ltd., Osaka, Japan

[21] Appl. No.: 883,764

[22] Filed: Jul. 9, 1986

[30] Foreign Application Priority Data

Jul. 10, 1985 [JP] Japan ................................ 60-152887

[51] Int. Cl.⁴ .............................................. C08J 5/14
[52] U.S. Cl. ...................................... 523/152; 523/153; 523/155; 523/156; 523/157; 523/158; 523/159
[58] Field of Search ............... 523/152, 153, 155, 156, 523/157, 158, 159

[56] References Cited

U.S. PATENT DOCUMENTS

| | | | |
|---|---|---|---|
| 3,434,998 | 3/1969 | Aldrich et al. | |
| 3,873,490 | 3/1975 | Grazen et al. | 523/157 |
| 4,014,828 | 3/1977 | Thorpe | 523/157 |
| 4,014,850 | 3/1977 | Thorpe | 523/157 |
| 4,269,754 | 5/1981 | Lang et al. | 523/158 |
| 4,420,571 | 12/1983 | Blickensderfer et al. | 523/157 |
| 4,656,203 | 4/1987 | Parker | 523/152 |
| 4,663,368 | 5/1987 | Harding et al. | 523/156 |

FOREIGN PATENT DOCUMENTS

| | | | |
|---|---|---|---|
| 38689 | 10/1981 | European Pat. Off. | 523/156 |
| 2142995 | 3/1973 | Fed. Rep. of Germany | 523/152 |
| 60-96625 | 5/1985 | Japan | 523/156 |

*Primary Examiner*—Lewis T. Jacobs
*Attorney, Agent, or Firm*—Cushman, Darby & Cushman

[57] ABSTRACT

A friction material comprising 40 to 95% by volume of a granular material and a thermoset binder resin for binding said granular material, said granular material having been produced by binding at least one powder material with a binder resin so that at least 50% by weight of the granules has a particle size between 140 mesh on and 7 mesh pass, which has good fade resistance and wear resistance.

8 Claims, 2 Drawing Sheets

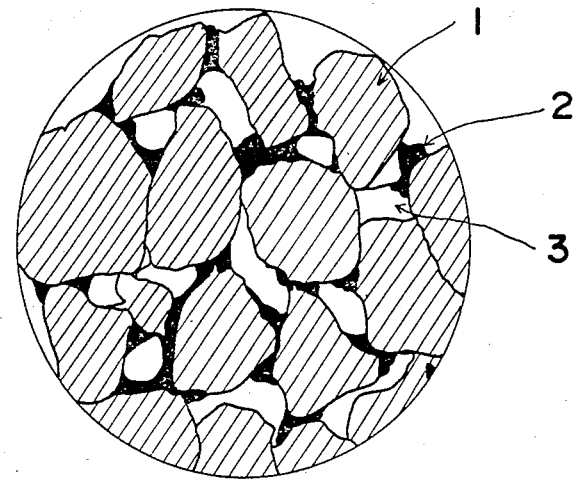
Fig. 3
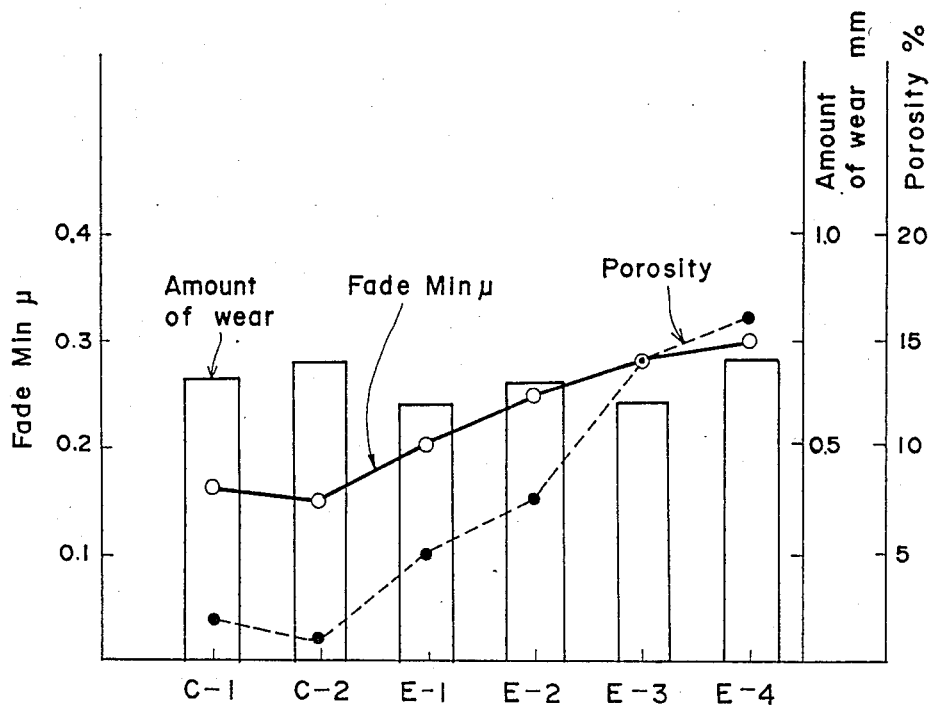

FRICTION MATERIAL

FIELD OF THE INVENTION

The present invention relates to a friction material. More particularly, it relates to a friction material useful for a brake and having good fade resistance and wear resistance.

BACKGROUND OF THE INVENTION

A friction material for a brake is produced by binding an organic powder material (e.g. cashew nut shell dust and rubber powder), an inorganic powder material (e.g. barium sulfate, iron oxide and graphite) or metal powder (e.g. copper powder and iron powder) together with a fiber material (e.g. asbestos, metal fiber, ceramic fiber, glass fiber and aramid fiber) with a thermoset resin such as phenol resin followed by molding and curing.

When the brake is abruptly heated to a high temperature by, for example, continuous use, so-called fading is caused, this resulting in decrease of braking effect. "Automobile Technology" (Jidosha Gijutsu), Vol. 27, No. 2, (1973) 148-156 describes conventional technologies and fading of a brake. According to this literature, one of the main causes of fading of the brake is attributed to a gas, which is generated by decomposition of the organic material contained in the friction material by frictional heat and present on a friction surface of the brake, which reduces the apparent coefficient of friction. Several measures have been proposed to increase fade resistance of the friction material. Such measures include increases of porosity of a pad to form minute conduits for ventilating the gas, and scorching wherein the pad is thermally treated to evaporate volatile materials.

The porosity of the pad can be increased by decreasing an amount of the binder resin or by reducing molding pressure. However, both of these procedures deteriorate wear resistance of the friction material although it can increase the porosity. The scorching of the material not only raises production costs due to increase of the number of production steps but also requires a troublesome treatment of the generated gas. Further, the scorching is associated with decrease of the wear resistance of the friction material due to thermal deterioration.

According to the conventional art, wear of the friction material is increased when the porosity is increased so as to improve the fade characteristics of the friction material. A reason for this is that a binding structure of the whole material is roughened by the reduced molding pressure or the decreased amount of the binder resin. If a microstructure of the friction material could be made tough and dense and micropores through which gas passes could be formed in the structure, the fade resistance of the friction material would be improved with keeping the decrease of the wear resistance at a minimum level.

Such friction material could be produced by molding a tough and dense friction material with using a sufficient amount of the binder resin under high molding pressure and thereafter forming bores through the friction material over the whole surface thereof by means of a minute drill. However, such manner is not suitable for practical and industrial production of the friction material.

SUMMARY OF THE INVENTION

One object of the present invention is to provide a friction material with good fade resistance and wear resistance.

Another object of the present invention is to provide a friction material having a dense structure and micropores through which gas passes.

These and other objects are accomplished by a friction material which comprises 40 to 95% by volume of a granular material and a thermoset binder resin for binding said granular material, said granular material having been produced by binding at least one powder material with a binder resin so that at least 50% by weight of the granules has a particle size between 140 mesh on and 7 mesh pass. The granular material may further include a fiber material.

BRIEF DESCRIPTION OF THE DRAWINGS

FIG. 1 is a schematic illustrate of a composition according to the present invention;

FIG. 3 is a graph illustrating the porosity of the pads produced in the examples disclosed below.

DETAILED DESCRIPTION OF THE INVENTION

Figure 2:
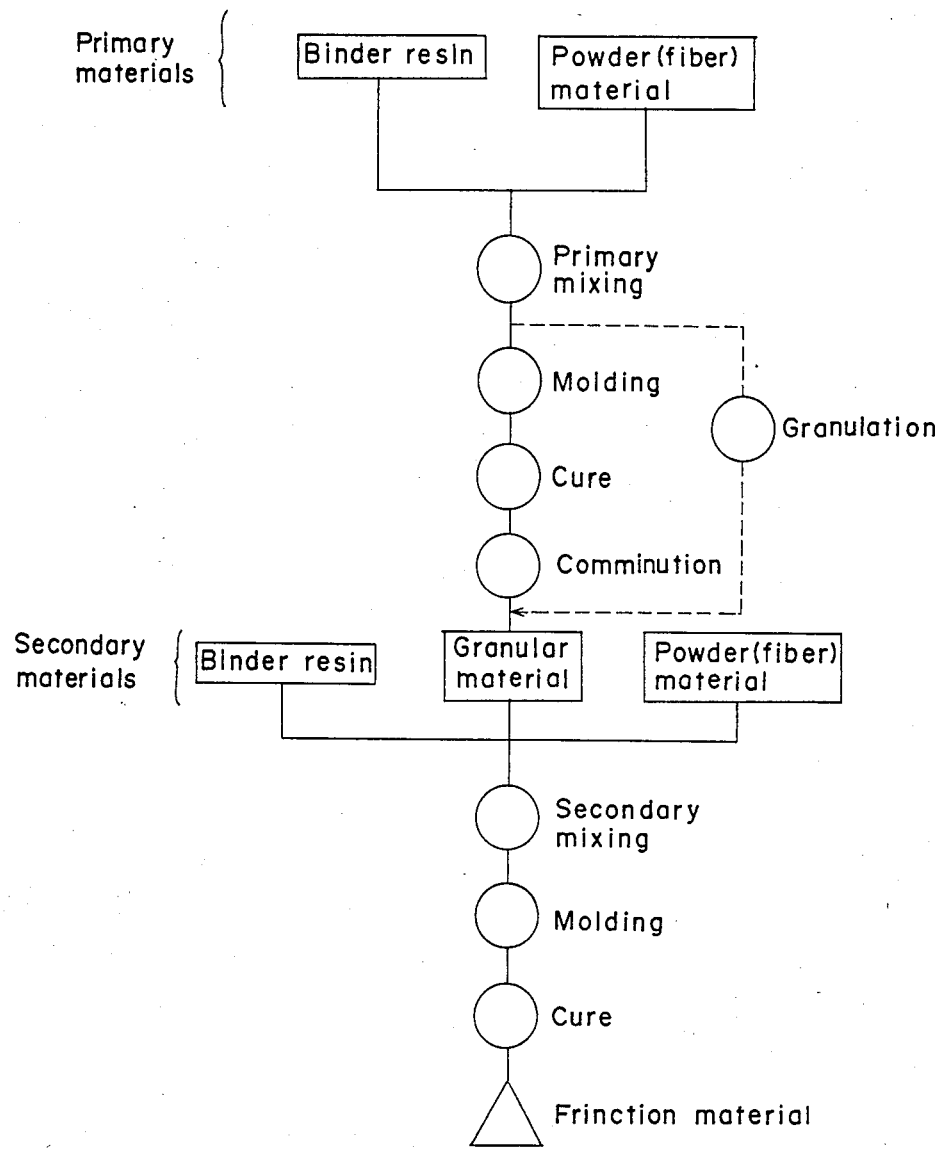
FIG. 2 is a schematic representation of the process steps of the present invention.

According to the present invention, the powder material is bound with a binder resin (e.g. phenol resin, resol resin and the like) to form granules with a dense and tough structure. Examples of the powder material are an organic powder material (e.g. cashew nut shell dust, rubber powder and the like), an inorganic powder material (e.g. barium sulfate, antimony sulfide, calcium carbonate and the like), a powdery lubricant (eg. graphite, molybdenum disulfide and the like), metal powder (e.g. copper powder, iron powder and the like) or a mixture thereof. Preferably, the granular material comprises at least one inorganic powder material and at least one powdery lubricant.

Granulation of the powder material may be carried out by any of a number of conventional methods, for example, by rolling granulation or extrusion granulation. Alternatively, the powder material and the binder may be molded by compression or extrusion molding to form a more dense molded article and then ground to form the granular material. In the granulation of the powder material, the fiber material may be granulated together with the powder material.

In granulation, the amount of the binder resin is from 5 to 80% by volume, preferably from 10 to 50 by volume based on the whole volume of the granular material.

The granular material is then bound together with the powder material and optionally the fiber material by the binder resin.

In this processing, it is essential to form spaces between the granules as schematically shown in FIG. 1. For this end, the amount of the binder resin 2 should be such that the resin 2 does not fill all the spaces surrounded by the granules 1. Further, the amounts of the powder material or the fiber material should be such that it does not fill the spaces between the granules so as to achieve the improvement of the strength of the material, friction characteristics and properties of the material. Therefore, the amount of the granules should be 40 to 95% by volume of the whole volume of the friction material.

When the powder material and/or the fiber material is contained in the friction material, the amount of the binder resin preferably at least 3% by volume so as to produce a sufficiently tough friction material.

Preferably, the granular material has such strength that it is not broken under subsequent molding conditions including pressure and temperature. If the granules are broken, the spaces between the granules are filled with the broken particles so that pores are not formed in the friction material as intended.

Distribution and porosity of the pores may be controlled by particle size distribution of the granular material, shape of the granules and/or the amount of the binder resin. Further, they are influenced by the powder material and/or the fiber material contained in the friction material.

The above described processing steps are summarized in FIG. 2. As shown in FIG. 2, the fiber material may be added to the granular material in the primary mixing, although it may be mixed with the granular material in the secondary mixing. In the former case, the drop out of the of the fiber material from the friction material can be prevented, while cohesive force of the granules are weakened.

Examples of the fiber material are inorganic fiber such as asbestos, rock wool, slug fiber, glass fiber, carbon fiber, ceramic fiber metal fiber and ceramic fiber and organic fiber such as phenol resin fiber, cellulose fiber and aramid fiber.

U.S. Pat. No. 3,434,998 discloses addition of granules of plural powder materials such as metal powder and inorganic powder bound with a binder resin to a friction material. Said patent describes an object, manner and effect to reduce adverse effects of hard particles which are added to increase heat resistance of the resin and coefficient of friction of the friction material by the use of the composite friction particles. However, it is silent on the improvement of the microstructure of the friction material and the formation of continuous pores therethrough. Thus, according to said patent, the amount of the granules to be added to the friction material is 1.5 to 25% by volume.

According to the present invention, the granular material is added in an amount of at least 40% by volume based on the whole volume of the friction material to adequately form the pores through the friction material. When the amount of the granular material exceeds 95% by volume, the strength of the friction material is deteriorated since the amount of the binder resin is too small.

The particle size of the granule is not less than 140 mesh pass. When it is less than 140 mesh pass, it is as small as powder so that effective pores cannot be formed in the friction material. On the contrary, when the particle size is 7 mesh on or larger, the granules are not suitable for producing a homogeneous friction material. Therefore, according to the present invention, at least 50% by weight the granules is between 140 mesh on and 7 mesh pass. A mesh size of 140 mesh is 0.105 mm and that of 7 mesh is 2.830 mm. "140 mesh on" and "7 mesh pass" used herein are intended to mean that the granule does not pass a 140 mesh sieve and passes through a 7 mesh sieve.

According to the present invention, the granular material and optionally the fiber material, the powder material and/or other additives (e.g. abrasives, calcium hydroxide, etc.) are mixed with the thermoset resin as the binder. Conveniently, a powdery binder resin is used and the materials are dry mixed. Preferably, a liquid binder resin is used to improve wettability of the granular material with the resin and to prevent dropping or segregation of the the materials. Further, the materials can be dry mixed with the powdery binder resin followed by the addition of a solvent compatible with the materials and thereafter the solvent is removed and the mixture is heated and molded at a temperature higher than the reaction temperature of the binder resin.

After molding, the article is post cured at a temperature of 200° to 300° C. for 1 to 10 hours. Alternatively, the mixture can be molded at a temperature lower than the reaction temperature of the binder resin and then cured by heating the molded article with preventing relaxation of the article during which the article may be post cured.

Practically and presently preferred embodiments of the present invention will be illustrated by following examples.

EXAMPLES 1-4 AND COMPARATIVE EXAMPLES 1-2

Components of Table 1 were mixed by means of a cross-blade type mixer.

TABLE 1

| Component | % by volume |
|---|---|
| Barium sulfate | 22.8 |
| Graphite | 9.8 |
| Antimony sulfide | 9.8 |
| Copper powder | 5.3 |
| Calcium hydroxide | 2.3 |
| Phenol-novolak resin | 50 |

The mixture was charged in a mold and press molded at 180° C. under surface pressure of 90 kg/cm$^2$ for 6 minutes with degassing. Then, the molded article was cured at 200° C. for 4 hours. Porosity of the cured article was measured by means of a mercury porosimeter with increasing a pressure up to 4,200 kg/cm$^2$ to find to be about 0.4%.

The cured material was ground by a hammer to obtain five kinds of granular materials (A to E) each containing a granules between 140 mesh on and 7 mesh pass in a proportion shown in Table 2.

TABLE 2

| Kind | Proportion of granules between 140 mesh on and 7 mesh pass (% by weight) |
|---|---|
| A | 40 |
| B | 50 |
| C | 60 |
| D | 80 |
| E | 100 |

For comparison, the molded article was completely ground to give granules all of which were 140 mesh pass (Comparative Sample F).

The materials shown in Table 3 were mixed by means of a cross-blade mixer and then press molded at 160° C. under surface pressure of 300 kg/cm$^2$ for 9 minutes. Thereafter, the molded article was cured at 180° C. for 4 hours and then at 210° C. for 4 hours to produce a pad for a disc brake.

TABLE 3

| Material (wt %) | Example No. | | | | | |
|---|---|---|---|---|---|---|
| | C-1 | 1 | 2 | 3 | 4 | C-2 |
| Granular material A | 75 | | | | | |
| Granular material B | | 75 | | | | |
| Granular material C | | | 75 | | | |
| Granular material D | | | | 75 | | |
| Granular material E | | | | | 75 | |
| Comparative material F | | | | | | 75 |
| Aramid fiber | 6 | 6 | 6 | 6 | 6 | 6 |
| Steel fiber | 6 | 6 | 6 | 6 | 6 | 6 |
| Ceramic fiber | 4 | 4 | 4 | 4 | 4 | 4 |
| Phenol-novolak resin | 9 | 9 | 9 | 9 | 9 | 9 |
| (Total) | 100 | 100 | 100 | 100 | 100 | 100 |

Porosity of the produced pads are shown in FIG. 3 (black circles).

Each of the produced pads was installed in an automobile brake and subjected to a dynamometer test. A test code used was partially modified JASO C406-74 (by using a PD 51 type caliper with moment of inertia if 5.5 kg.m.S$^2$). Among the test results, fade min$\mu$ (minimum $\mu$ in the fade test) (open circles) and a wear amount are shown in FIG. 3. Allowable level of the fade min$\mu$ is 0.2 or more.

EXAMPLES 5–7 AND COMPARATIVE EXAMPLES 3–4

In the same manners as in Examples 1–4 but using the materials shown in Table 4, a pad for a disc brake was produced and tested.

TABLE 3

| Material (wt %) | Example No. | | | | | |
|---|---|---|---|---|---|---|
| | C-3 | 5 | 6 | 3 | 7 | C-4 |
| Granular material D | 30 | 40 | 60 | 75 | 95 | 97 |
| Aramid fiber | 6 | 6 | 6 | 4 | 0 | 0 |
| Steel fiber | 6 | 6 | 6 | 4 | 0 | 0 |
| Ceramic fiber | 4 | 4 | 4 | 3 | 0 | 0 |
| Phenol-novolak resin | 16 | 14 | 12 | 0 | 0 | 0 |
| Powder material G*[1] | 38 | 30 | 12 | 0 | 0 | 0 |
| (Total) | 100 | 100 | 100 | 100 | 100 | 100 |

Note
*[1]A mixture of the components of Table 1 except the phenol-novolak resin in the same ratio as shown in Table 1.

Porosity of each pad and results of dynamometer test are summarized in Table 5.

TABLE 5

| | Example No. | | | | | |
|---|---|---|---|---|---|---|
| | C-3 | 5 | 6 | 3 | 7 | C-4 |
| Porosity (%) | 2 | 5.1 | 7.5 | 14 | 30 | 35 |
| Fade min$\mu$ | 0.15 | 0.21 | 0.25 | 0.28 | 0.3 | Not measured due to break of article |
| Amount of wear (mm) | 0.8 | 0.75 | 0.75 | 0.7 | 1.0 | |

EXAMPLES 8–10 AND COMPARATIVE EXAMPLE 5

In the same manner as in Example 1, a press molded article with a thickness of 1.01, 1.03, 1.04 or 1.06 time as thick as that of the article of Example 1 was produced with inserting a spacer. Porosity of the cured article was about 1, 3, 4 or 5%, respectively.

The cured article was ground in the same manner as in Example 1 to obtain a granular material having the same particle size distribution as that of the granular material D. Then, a pad was produced and tested in the same manners as in Example 3. When the granular material itself had porosity larger than 4%, a wear amount of the pad was increased as shown in Table 6. Thus, the wear amount of the pad is optimized by maintaining the porosity of the granules beneath 4%, which includes completely solid granules which, of course, have a porosity of 0%.

TABLE 6

| | Example No. | | | |
|---|---|---|---|---|
| | 8 | 9 | 10 | C-5 |
| porosity (%) | 14.5 | 16 | 16.5 | 17 |
| Fade min$\mu$ | 0.29 | 0.28 | 0.29 | 0.29 |
| Amount of wear (mm) | 0.8 | 0.9 | 1.0 | 2.5 |

EXAMPLE 11

The same components of Table 1 but using a liquid resol resin in place of the phenol-novolak resin were screw extruded at an extrusion temperature of 140° to 150° C. to form a rod shape article of 20 mm in diameter.

The rod was sliced to chips with a suitable size for grinding and cured at 170° C. for 4 hours and then at 200° C. for 4 hours. The cured material was ground to obtain a granular material having the same particle size distribution as the material D.

In the same manners as in Example 3, a pad was produced and tested. The results were substantially the same as in Example 3.

What is claimed is:

1. A friction material comprising 40 to 95% by volume of a granular material and a thermoset binder resin for binding said granular material, said granular material having been produced by binding at least one powder material with a binder resin so that at least 50% by weight of the granules has a particle size between 140 mesh on and 7 mesh pass, said granular material having a porosity of 4% or less.

2. The friction material according to claim 1, wherein the granular material comprises at least one powder material selected from an inorganic powder material, an organic powder material, a powdery lubricant and metal powder.

3. The friction material according to claim 2, wherein the granular material comprises at least one inorganic powder material and at least one powdery lubricant.

4. The friction material according to claim 1, wherein the granular material further comprises a fiber material.

5. The friction material according to claim 1, which further comprises at least one powder material.

6. The friction material according to claim 5, which further comprises at least one fiber material.

7. The friction material according to claim 1, wherein the granular material has been produced by press molding a mixture containing the powder material and the binder resin and grinding the molded material.

8. The friction material according to claim 1, wherein the granular material has been produced by extrusion molding a mixture containing the powder material and the binder resin and grinding the molded material.

* * * * *